United States Patent
Varekamp (10) Patent No.: US 12,423,839 B2
(45) Date of Patent: Sep. 23, 2025

(54) TRAINING ALIGNMENT OF A PLURALITY OF IMAGES

(71) Applicant: KONINKLIJKE PHILIPS N.V., Eindhoven (NL)

(72) Inventor: Christiaan Varekamp, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 442 days.

(21) Appl. No.: 17/909,452

(22) PCT Filed: Mar. 16, 2021

(86) PCT No.: PCT/EP2021/056605
§ 371 (c)(1),
(2) Date: Sep. 6, 2022

(87) PCT Pub. No.: WO2021/185795
PCT Pub. Date: Sep. 23, 2021

(65) Prior Publication Data
US 2023/0162379 A1 May 25, 2023

(30) Foreign Application Priority Data
Mar. 17, 2020 (EP) .................................. 20163576

(51) Int. Cl.
*G06T 7/00* (2017.01)
*G06T 7/30* (2017.01)

(52) U.S. Cl.
CPC ...... *G06T 7/30* (2017.01); *G06T 2207/20081* (2013.01); *G06T 2207/20084* (2013.01); *G06T 2207/20212* (2013.01)

(58) Field of Classification Search
CPC ............. G06T 7/30; G06T 2207/20081; G06T 2207/20084; G06T 2207/20212; G06T 2207/10012
See application file for complete search history.

(56) References Cited

U.S. PATENT DOCUMENTS

| 6,546,137 B1 * | 4/2003 | Lai | G06V 10/7515 |
| | | | 382/156 |
| 6,784,927 B1 * | 8/2004 | Itokawa | H04N 23/6811 |
| | | | 348/208.1 |
| 2012/0133786 A1 * | 5/2012 | Watanabe | H04N 23/68 |
| | | | 348/208.4 |

(Continued)

OTHER PUBLICATIONS

Ito et al "An Automated Method for Generating Training Data for Image Registration Using Deep Learning" IEICE Technical Report The Institute of Eletronics, Information and Communication Engineers, (Jul. 2017).

(Continued)

*Primary Examiner* — Van D Huynh (57) ABSTRACT

Presented are concepts for generating an input image dataset that may be used for training the alignment of multiple synthesized images. Such concepts may be based on an idea to generate an input image dataset from copies of an arbitrary reference image that are shifted in various directions. In this way, a single arbitrary image may be used to create an artificial misaligned input image input sample (i.e. input image dataset) that can be used to train a neural network.

18 Claims, 9 Drawing Sheets

(56) References Cited

U.S. PATENT DOCUMENTS

| | | | | |
|---|---|---|---|---|
| 2016/0133018 | A1* | 5/2016 | Machado | G06T 3/18 |
| | | | | 382/131 |
| 2016/0228075 | A1* | 8/2016 | Kitamura | A61B 6/12 |
| 2018/0137633 | A1* | 5/2018 | Chang | G06N 3/045 |
| 2018/0249889 | A1* | 9/2018 | Imai | A61B 1/0655 |
| 2020/0120271 | A1* | 4/2020 | Furukawa | H04N 23/951 |
| 2021/0076917 | A1* | 3/2021 | Kamon | A61B 1/0661 |
| 2021/0161363 | A1* | 6/2021 | Makino | G06N 3/084 |
| 2021/0264175 | A1* | 8/2021 | Zhang | G08G 1/166 |
| 2022/0130047 | A1* | 4/2022 | Saha | A61B 5/6821 |
| 2022/0207722 | A1* | 6/2022 | Kim | G06T 7/0014 |
| 2022/0335610 | A1* | 10/2022 | Shiratani | G06V 10/82 |
| 2022/0351396 | A1* | 11/2022 | Sakamoto | G06T 7/0012 |

OTHER PUBLICATIONS

Abche et al "Image Registration Based on Neural Network and Fourier Transform" Conf . Proceedings Annual Int. Conf. on the IEEE Engineering in Med. and Bio. Soc. Aug. 30, 2006 p. 4803-4806.

Ignacio Rocco et al "Convolutional Neural Network Architecture for Geometric Matching" IEEE Transactions on Pattern Analysis and Machine Intelligence, vol. 41,, No. 11 Nov. 1, 2019 p. 2553-2567.

De La Torre et al "Parameterized Kernel Principal Component Analysis" Computer Vision and Pattern Recognition, Jun. 23, 2008 p. 1-8.

International Search Report and Written Opinion from PCT/EP2021/056605 mailed May 2, 2021.

* cited by examiner

GroundTruth    Blend    SnapNet (a)    (b)    (c)

TRAINING ALIGNMENT OF A PLURALITY OF IMAGES

CROSS-REFERENCE TO PRIOR APPLICATIONS

This application is the U.S. National Phase application under 35 U.S.C. § 371 of International Application No. PCT/EP2021/056605, filed on Mar. 16, 2021, which claims the benefit of EP Patent Application No. EP 20163576.0, filed on Mar. 17, 2020. These applications are hereby incorporated by reference herein.

FIELD OF THE INVENTION

The invention relates to the field of image alignment, and more particularly to training a neural network for aligning a plurality of images (e.g. for synthesizing a view).

BACKGROUND OF THE INVENTION

Depth information (such as an estimated depth map (geometry)) is necessary to synthesize/render a virtual view based on observed/captured images. When predicting a virtual/synthesized view from multiple reference images, the use of biased and/or inaccurate depth information can result in visibly shifted textures and/or visible transitions when an observer alters the virtual view. For instance, double images/shifted textures may result from a bias (e.g. over or under-estimation) of depth maps. Automatic and/or accurate acquisition of depth information is therefore desirable.

However, automatic extraction of 3D geometric information from multiple camera images has proven to be difficult. A particular difficulty may be that accurate depth information is unavailable due to a lack of reliable depth cues. Improved depth estimation for multi-view images has only resulted in moderate improvements in the quality of synthesized views for a 3D reconstruction.

Known approaches to obtaining depth information include using infrared light sources, infrared time of flight, manual refinement in post-production and imposing application-dependent constraints. However, for many live-events, both post-production and the use of infrared light sources is not viable.

Thus, there remains a need for a concept of obtaining data that may be useful for aligning a plurality of images and/or synthesizing a virtual view.

SUMMARY OF THE INVENTION

The invention is defined by the claims.

According to examples in accordance with an aspect of the invention, there is provided a method for generating an input image dataset for training a neural network for aligning a plurality of images. The method comprises: obtaining a first copy of a reference image; obtaining a second copy of the reference image; shifting the first copy of the reference image in a first direction to generate a first shifted image; shifting the second copy of the reference image in a second direction to generate a second shifted image; and generating an input image dataset comprising a plurality of images based on the first and second shifted images.

Proposed are concepts for generating an input sample that may be used for training the alignment of multiple synthesized images. Such concepts may be based on an idea to generate an input sample from copies of an arbitrary reference image that are shifted in various directions. In this way, a single arbitrary image may be used to create an artificial misaligned input sample (i.e. input image dataset) that can be used to train a neural network.

Proposed embodiments may, for example, employ a concept of taking an arbitrary image and shifting the original arbitrary image multiple times in opposite directions to create an artificial miss-aligned input image dataset. Such an approach may avoid a need for data annotation because the input sample data is created artificially. Proposed embodiments may also facilitate the creation of a large number of synthetic training samples. Further, applied shifts may be selected to model misalignment shifts that are expected (e.g. based on camera capture geometry, camera orientations, etc.).

Unlike conventional data augmentation, where operations are performed on a first sample $x_1$ to generate extra samples $x_2$, $x_3$, etc. (i.e. to increase dataset size), it is proposed to employ a reference image y (e.g. target output image) and use shifting and cropping operations to form synthetic input images $x_1$, $x_2$ that do not form individual samples, but instead are combined (e.g. stacked or concatenated) to form a single input sample $x=[x_1, x_2]$ for a neural network. By way of example, the shifting operations may be selected so as model anticipated misalignment between $x_1$ and $x_2$. For instance, to obtain $x_1$, a first instance of the reference image y is shifted according to a vector d, and to obtain $x_2$ a second instance of the reference image y is shifted according to a vector $-d$. Also, the direction and length of the vector d may be varied to model possible misalignment between $x_1$ and $x_2$ that may occur in practice. When used, a neural network may be trained to map $[x_1, x_2]$ to the reference image y, i.e. trained to map $[x_1, x_2] \to y$. By way of further example, when used to form four synthetic input images $x_1, x_2, x_3, x_4$ from y, a neural network may be trained to map $[x_1, x_2, x_3, x_4]$ to the reference image y, i.e. trained to map $[x_1, x_2, x_3, x_4] \to y$.

For instance, simple image shift and crop operations may be used on an arbitrary image (that may be easy to obtain) to generate a valuable training input sample. Also, the employed image shifts may be based on a statistical distribution that models misalignments which are typically observed.

In some embodiments, shifting the reference image in the first direction may comprise shifting a first copy the reference image by a distance in the first direction. Further, shifting the reference image in the second direction may then comprise shifting a second copy of the reference image by the same distance in a second, opposite direction. In this way, the two instances of the reference image may be shifted by an equal amount in opposite directions so that a neural network can be trained to shift the two shifted images towards an intermediate position exactly halfway therebetween.

Some embodiments may further comprise shifting a third copy of the reference image in a third direction to generate a third shifted image. Generating the input image dataset may then be further based on the third shifted image. It will therefore be appreciated that embodiments may be used to generated more than two shifted images from a single reference image. In this way, embodiments may support the generation a large number of synthetic training images.

By way of example, the shifting of the first, second and third copies of the reference image to generate the first, second and third shifted images may be represented by first, second and third vectors, respectively. The sum of the first, second and third vectors may then be equal to zero. Put another way, the shift operations used to create the plurality of shifted images may be configured such that the sum over all of the shift vectors is equal to zero. In this way, the reference image may be thought of as being at a centroid position (or centre of gravity), and this knowledge may be leveraged by a neural network in order to train a mapping of the shifted images to the reference image.

In an embodiment, generating the input image dataset may comprise concatenating the first and second shifted images. In this way, the shifted images that are generated from the reference images may be combined or stacked (e.g. in a channel axis) so as to form a single input image dataset (or tensor) for a neural network.

Shifting the first copy/instance of the reference image in a first direction may comprise: applying a shift operation to the first copy of the reference image so as to generate an intermediate image comprising all pixels of the reference image shifted in the first direction; and cropping the intermediate image so as to generate the first shifted image. Such embodiments may be based on an underlying assumption that, in a local spatial neighborhood, misalignment is constant. This, however, may not be the case for a region where (de-)occlusion/(un)-covering occurs, because in such a region misalignment may change rapidly. Accordingly, in some embodiments, occlusions may be accounted for by generating a shifted image after covering (i.e. occluding) a portion of the reference image. By way of example, in an embodiment, shifting the first copy of the reference image in a first direction may comprise: covering a portion of the first copy of the reference image with a foreground image so as to generate a partly-occluded image consisting of: a non-occluded portion of the reference image; and an occluded portion consisting of the foreground image; applying a first shift operation to the non-occluded portion of the reference image so as to generate an intermediate non-occluded portion comprising all pixels of the non-occluded portion of reference image shifted in the first direction by a first shifting distance; applying a second shift operation to the occluded portion so as to generate: an intermediate occluded portion comprising all pixels of the foreground image shifted in the first direction by a second, larger shifting distance; and an intermediate blank portion devoid of pixels from the reference image and foreground image; forming an intermediate image from: the intermediate non-occluded portion; the intermediate occluded portion; and the intermediate blank portion; and cropping the intermediate image so as to generate the first shifted image. The blank portion may, for example, be filled with a single colour value or zero data value, so that it can be easily identified and ignored during a training process for example. In this way, embodiments may be adapted to deal with occlusion by placing a foreground element (e.g. texture or image) over part of the reference image and then shifting it by a differing amount than the reference image (e.g. to simulate the uncovering of part of the reference image).

In an embodiment, shifting the first copy of the reference image in a first direction may comprise applying a shift operation to the first copy of the reference image, wherein the shift operation is configured to simulate a predicted misalignment of the reference image. Such embodiments may therefore model expected misalignment shifts so as to facilitate more accurate image alignment for example.

According to another aspect of the invention, there is provided a method of training a neural network for aligning a plurality of images, the method comprising: generating an input image dataset according to a proposed embodiment; and training the neural network to map the input image dataset to the reference image. Proposed embodiments may therefore be used to train a convolutional neural network to align images. In this way, an alignment network may be provided which is configured to snap two or more images together so that they align.

By way of example, the neural network may comprise a convolutional neural network architecture that was originally conceived for image segmentation. However, it is expected many other convolutional neural network architectures could be trained to align the multiple images. Embodiments may therefore be used in conjunction with many different forms or types of neural network.

According to another aspect of the invention, there is provided a computer program comprising code means for implementing a method according to an embodiment when said program is run on a processing system.

According to another aspect of the invention, there is provided a system for generating an input image dataset for training a neural network for aligning a plurality of images. The system comprises: a shift component configured to shift a first copy of a reference image in a first direction to generate a first shifted image, and to shift a second copy of the reference image in a second direction to generate a second shifted image; and a sample generator configured to generate a input image dataset based on the first and second shifted images.

According to yet another aspect of the invention, there is provided a system for training a neural network for aligning a plurality of images, the system comprising: a system for generating an input image dataset according to an embodiment; and a training component configured to train the neural network to map the input image dataset to the reference image.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. The mere fact that certain measures are recited in mutually different dependent claims does not indicate that a combination of these measures cannot be used to advantage.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

It should be understood that the Figures are merely schematic and are not drawn to scale. It should also be understood that the same reference numerals are used throughout the Figures to indicate the same or similar parts.

Proposed are concepts for generating an input sample for training a neural network to align images. Such concepts may generate an input image dataset from instances of a reference image that are each shifted in different directions. In this way, the reference image may be used to create an artificial input image dataset from multiple shifted versions of the reference image.

In particular, an input image dataset generated by a proposed embodiment may be used to train a neural network for image alignment. In this way, improved image/view-synthesis may be provided which reduces or avoids visibly shifted textures in a predicted/synthesized view. For instance, embodiments may be used to provide view predictions from multiple reference images that are seamlessly blended together (i.e. reduce or avoid visible transitions) when an observer alters a virtual camera view.

By way of example, proposed embodiments generate an input sample from an arbitrary reference image by shifting instances of the reference image in different directions and then combining the different shifted versions of the reference image. For instance, embodiments may take an arbitrary image (y) and shift instances of the image (y) in opposite directions to create an input image dataset (x) from the artificial miss-aligned images. The generated input image dataset (x) may, for example, be used to train a convolutional neural network to align a plurality of images.

By creating the input image dataset artificially, proposed embodiments may avoid a need for data annotation.

The employed shift operations may be selected so as to model expected misalignment shifts (e.g. due to image capture geometry, orientation, baselines, etc.).

Figure 1:
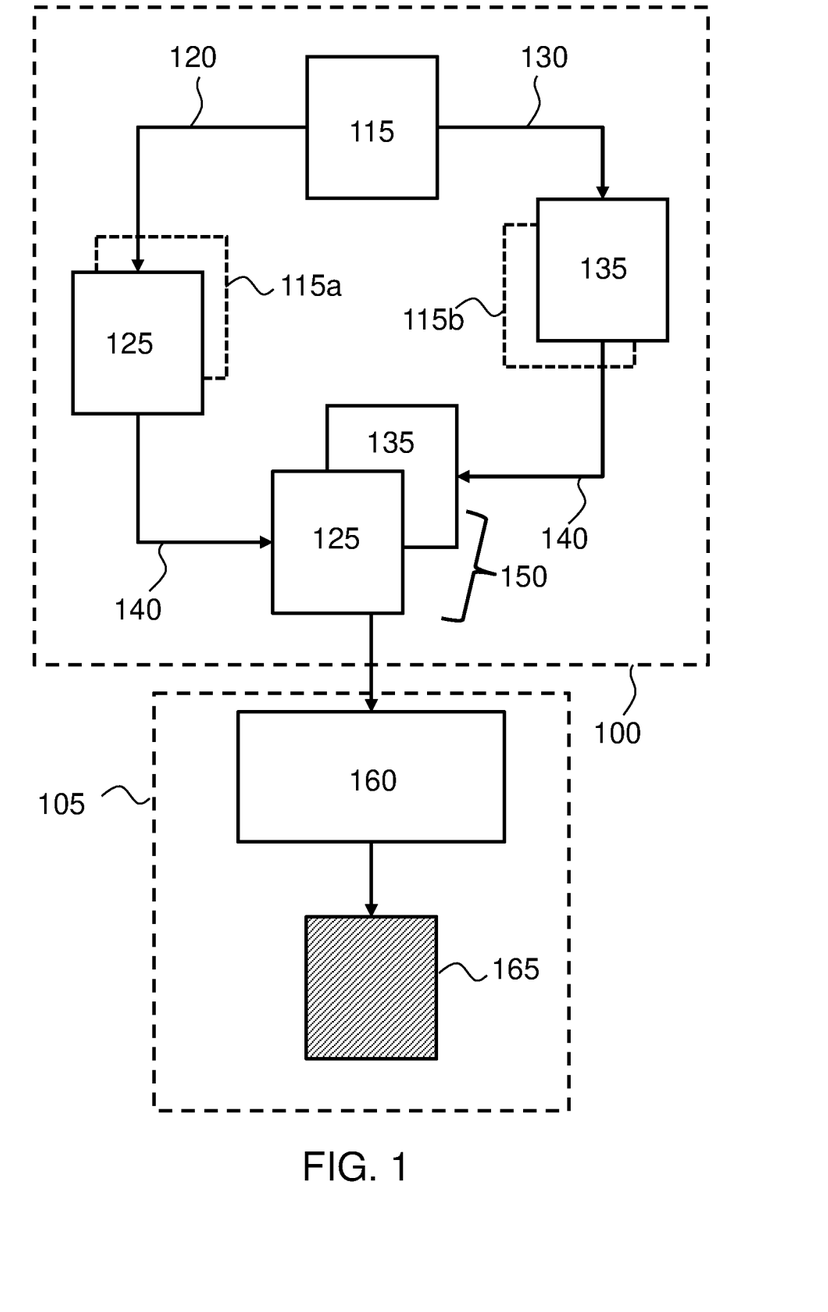
FIG. 1 illustrates a method of training a neural network for aligning a plurality of images according to a proposed embodiment.

Referring now to FIG. 1, there is illustrated a method of training a neural network for aligning a plurality of images according to a proposed embodiment. The method comprises two main stages: generating 100 an input image dataset from a reference image; and training 105 the neural network to map the input image dataset to the reference image.

More specifically, the first stage comprises a method 100 of generating an input image dataset for training a neural network according to a proposed embodiment. Here, an arbitrary reference image 115 is firstly shifted 120 in a first direction to generate a first shifted image 125. The reference image 115 is also shifted 130 in a second direction to generate a second shifted image 135.

By way of further explanation, the process of shifting 120 the reference image 115 in the first direction comprises shifting a first copy 115a of the reference image 115 by a first distance D in the first direction. More specifically, shifting 120 the first copy 115a of the reference image 115 in the first direction comprises applying a shift operation to the first copy 115a of the reference image so as to generate an intermediate image comprising all pixels of the reference image shifted in the first direction by the first distance D. Here, the shift operation is configured/selected so as to simulate a predicted misalignment of the reference image 115. The intermediate image is then cropped (e.g. to the same boundary as the reference image) so as to generate the first shifted image 125.

Similarly, the process of shifting 130 the reference image 115 in the second direction comprises shifting 130 a second copy 115b of the reference image 115 by the same distance D in a second, opposite direction.

Put another way, first 125 and second 135 shifted images are generated by shifting the first 115a and second 115b copies of reference image 115 by the equal distances D in opposite directions. Thus, where the shifting of the first 115a and second 115b copies of the reference image 115 to generate the first 125 and second 135 shifted images is represented by first $d_1$ and second $d_2$ vectors, respectively, the sum of the first and second vectors is equal to zero (i.e. $d_1+d_2=0$).

An input image dataset 150 is then generated by stacking 140 the first 125 and second 135 shifted images in the channel axis. For example, one may consider a colour (three channel) image of size w times h to be represented by a tensor with dimensions 3, w, h. An operation in neural network design is to concatenate (stack) multiple of such tensors. In the case of two colour images, the two colour images can be concatenated to form a single tensor with dimensions 6, w, h. Further (convolutional) operators act on this tensor and the network can hence start modeling the relations between colour values that occur at a certain pixel location in the two images. It is noted, however, that alternatively, the concatenation could happen later in the network after each image is processed with convolutional layers.

The generated input image dataset 150 is then provided to a neural network 160 for aligning images. In this example, the neural network 160 comprises a convolutional neural network that is configured to 'snap' two or more images so that they correctly align. The neural network 160 is trained to map the input image dataset 150 to the reference image 115. As a result, the neural network 160 may be configured to output a predicted image 165

It will be appreciated that the exemplary embodiment of FIG. 1 is configured to create a plurality of synthetic images (i.e. shifted images) from the reference image 115. In this way, proposed embodiments support the creation of a large number of synthetic images that can be combined into an input image dataset 150 for a neural network 160. Each synthetic image can be created in a relatively simple manner by shifting and cropping the reference in different directions.

The length of the shift vector may be generated from a uniform distribution. However, it is envisaged that some embodiments may generate more synthetic images with a shift closer to zero than with much larger shifts. For example, clipped versions of log normal or negative exponential distributions may be used to model predicted/expected misalignments.

Figure 2A:
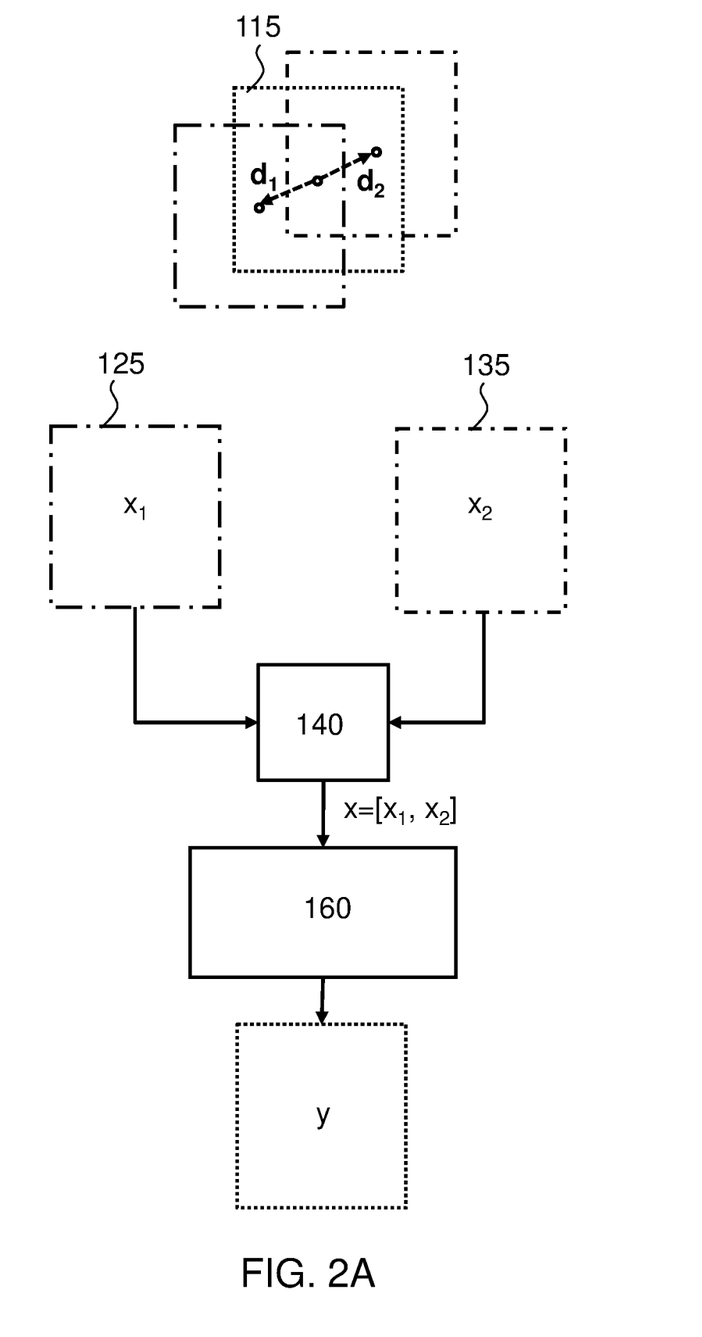
FIG. 2A depicts an embodiment of a method for generating an input image dataset for training a neural network for aligning a plurality of images.

Referring now to FIG. 2A, there is depicted an embodiment wherein the reference image 115 is shifted by a first vector $d_1$ and cropped to generate a first shifted image $x_1$ 125. The original reference image 115 is also shifted by a second vector $d_2$ and cropped to generate a second shifted image $x_2$ 135. The second vector $d_2$ is equal in size but opposite in direction to the first vector $d_1$. Thus, the sum of the first $d_1$ and second $d_2$ vectors is equal to zero (i.e. $d_1+d_2=0$).

The first $x_1$ and second $x_2$ shifted images are then stacked 140 to form an input image dataset x comprising a plurality of images. More specifically, in this example, the first $x_1$ and second $x_2$ shifted images are concatenated so that $x=[x_1, x_2]$.

The input image dataset x is provided as the input to the neural network 160. The neural network 106 is then trained to predict a third image y that was not shifted (i.e. the reference image 115). Since the applied shifts $d_1$ and $d_2$ are opposite in direction, the neural network 160 learns to shift the first $x_1$ and second $x_2$ shifted images towards the intermediate position exactly halfway therebetween.

Figure 2B:
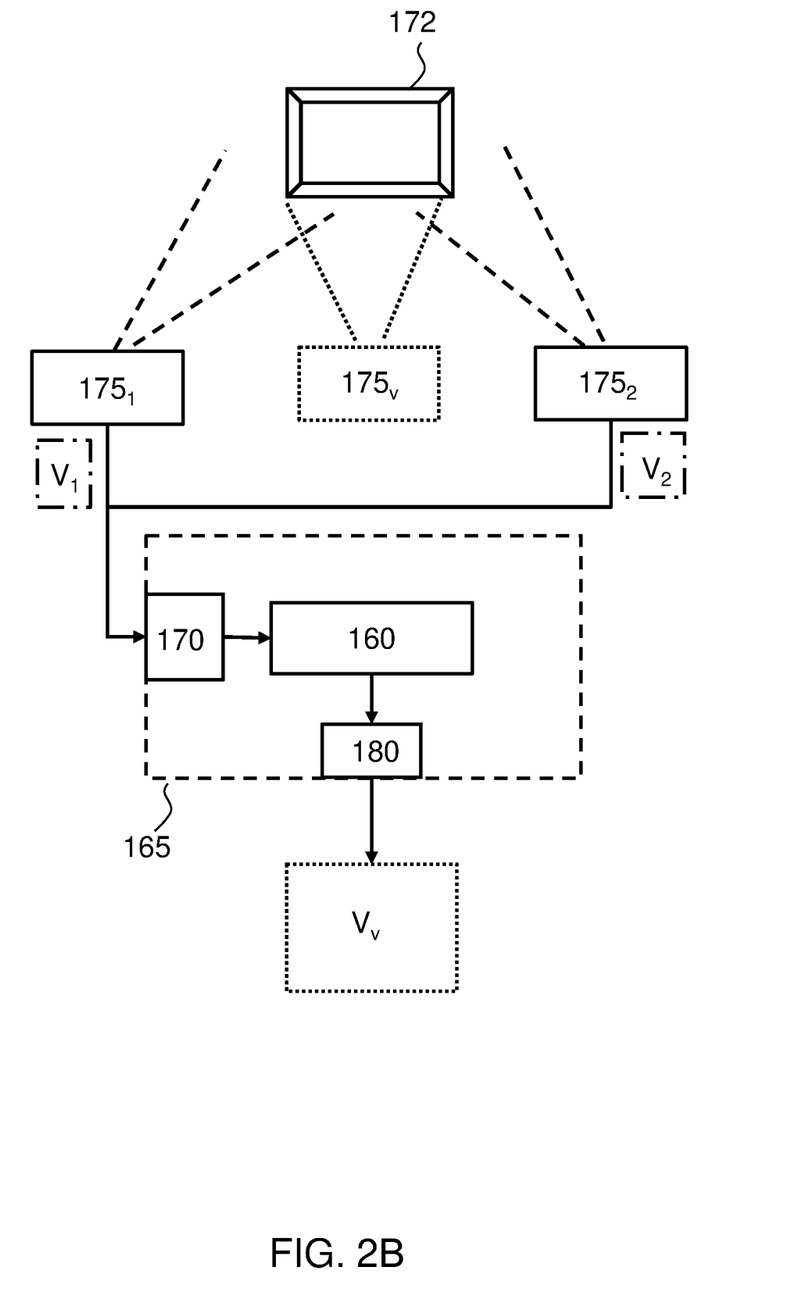
FIG. 2B depicts an embodiment of a system for aligning a plurality of images according to a proposed embodiment, wherein the system comprises the neural network of FIG. 2A.

The trained neural network 160 of FIG. 2A may, for instance, be employed in a system for aligning a plurality of images. By way of example, FIG. 2B depicts an embodiment of a system 165 for aligning a plurality of images according to a proposed embodiment, wherein the system comprises the neural network of FIG. 2A. In this example, the system 165 is adapted to generate one or more virtual images (e.g. views) by aligning obtained images (e.g. captured views).

More specifically, the system 165 comprises an input interface 170 that is adapted to obtain images representing views of an object 172 captured by a plurality of differently positioned image capture devices 175 (e.g. cameras). In this example, a first image capture device $175_1$ captures a first image (i.e. first view) $V_1$ of the object 172, and a second image capture device $175_2$ captures a second image (i.e. second view) $V_2$ of the object 172. The input interface 170 receives the first $V_1$ and second $V_2$ images and inputs them to the neural network 160 (which has been trained according the embodiment of FIG. 2A). Based on the first $V_1$ and second $V_2$ images, the neural network 160 generates an image representing a view of the object 172 captured by a virtual capture device 175v positioned between the first $175_1$ and second $175_2$ image capture devices. In other words, according to the training of the neural network 160, the neural network 160 aligns the first $V_1$ and second $V_2$ images (representing first and second views) to generate a virtual camera view $V_V$ of the object 172. The generated virtual camera view $V_V$ is output via an output interface of the system 165.

From the above example of FIG. 2B, it will be appreciated that a neural network trained using input samples generated according to the proposed concept(s) may be employed to synthesize/render a virtual view based on observed/captured images. Thus, a single arbitrary image may be used to create input image dataset for training a neural network, and that trained neural network may subsequently be employed (e.g. within a system) for aligning images and/or synthesizing a virtual view.

It is to be understood that the specific neural network architecture may be less relevant than the way the input sample data is generated. However, purely by way of completeness, it is noted that the known Unet architecture works well (Reference: O. Ronneberger, P. Fischer, T. Brox, 2015. UNet: Convolutional Networks for Biomedical Image Segmentation). Further, it is expected that changing the architecture may improve results. Nonetheless, a variation of the known UNet architecture that has been tested by the inventors is shown in FIG. 3.

Figure 3:
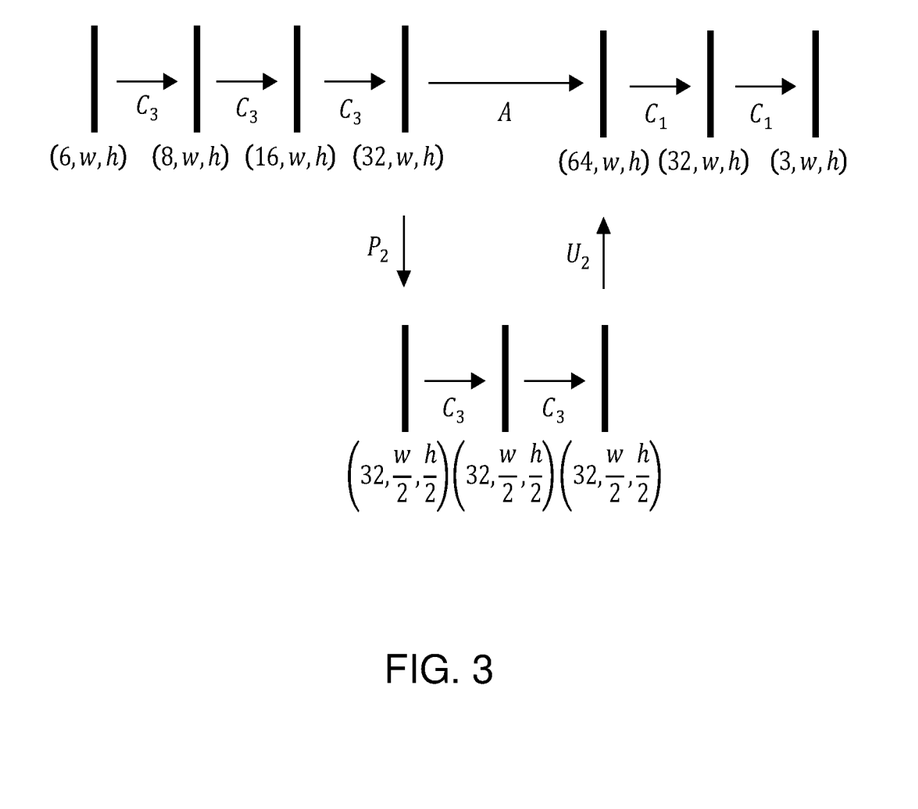
FIG. 3 depicts an exemplary UNet architecture that may be employed for a neural network of a proposed embodiment.
Figure 4:
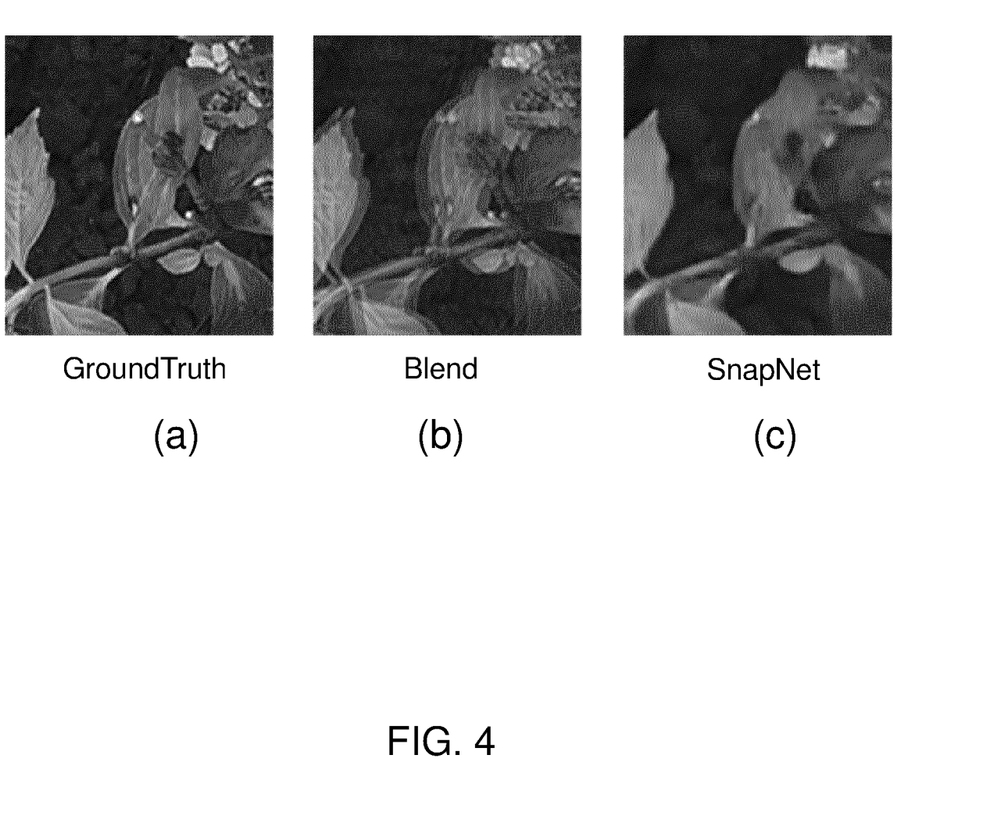
FIG. 4 illustrates an exemplary result of applying a proposed neural network (c) presented next to: (a) the ground truth; and (b) a conventional blending method.

More specifically, FIG. 3 depicts an exemplary UNet architecture that may be employed for a neural network of a proposed embodiment. In the depicted architecture of FIG. 3:

$C_k$=Convolution with k×k kernel
$P_k$=Factor k downscale average
$U_k$=Factor k bilinear upsampling
A=Concatenate along channel axes
$N_{conv}=N_{in}N_{out}k^2+N_{out}$
$N_{down}=0$
$N_{up}=0$
$N_{total}=26923$ By way of illustration, FIG. 4(c) shows the result of applying the proposed neural network. For comparison, the result of the proposed embodiment shown in FIG. 4(c) is presented next to: (a) the ground truth; and (b) a conventional blending method.

As may be seen from the images in FIG. 4, when the shift is large due to depth bias, double images appear when using the conventional blending method (shown in FIG. 4(b)), whereas the result of the proposed embodiment (shown in FIG. 4(c)) aligns on the most important contours present in the picture.

It is to be understood that proposed concepts can be extended to align the prediction originating from more than two reference images (e.g. from the closest three or four reference images). In such an example, the proposed simulation approach using shifted and cropped images can be used. The ground truth image can then, for example, be defined to lie at the centre of gravity of pseudo-randomly applied shifts of the more than two reference images. That is, all translation vectors that are applied can be configured to sum to zero. For such a case, a neural network may then take as its input the stack of all shifted images from the reference images (e.g. various camera views) and then learn to predict a final central image.

Embodiments described above model a global translation shift for a pixel. This is based on an assumption that the output view can be predicted by just shifting the multiple reference pixels. However, this may not always be the case. For instance, de-occlusion (i.e. uncovering) may occur when one (or multiple) camera(s) look around a foreground object that is occluding (i.e. blocking the view of) a background.

Proposals may be modified or extended to address (i.e. cater for) occlusions. For example, referring now to FIG. 5, there is depicted an embodiment wherein, for the creation of each shifted image, there is applied a pseudo-random shift combined with a shift of a newly placed foreground texture with a vector kd and −kd (where k is a scalar that can have both negative and positive values and |k|≥1). The change is shift between the two (i.e. foreground and background) textures simulates depth differences.

Figure 5:
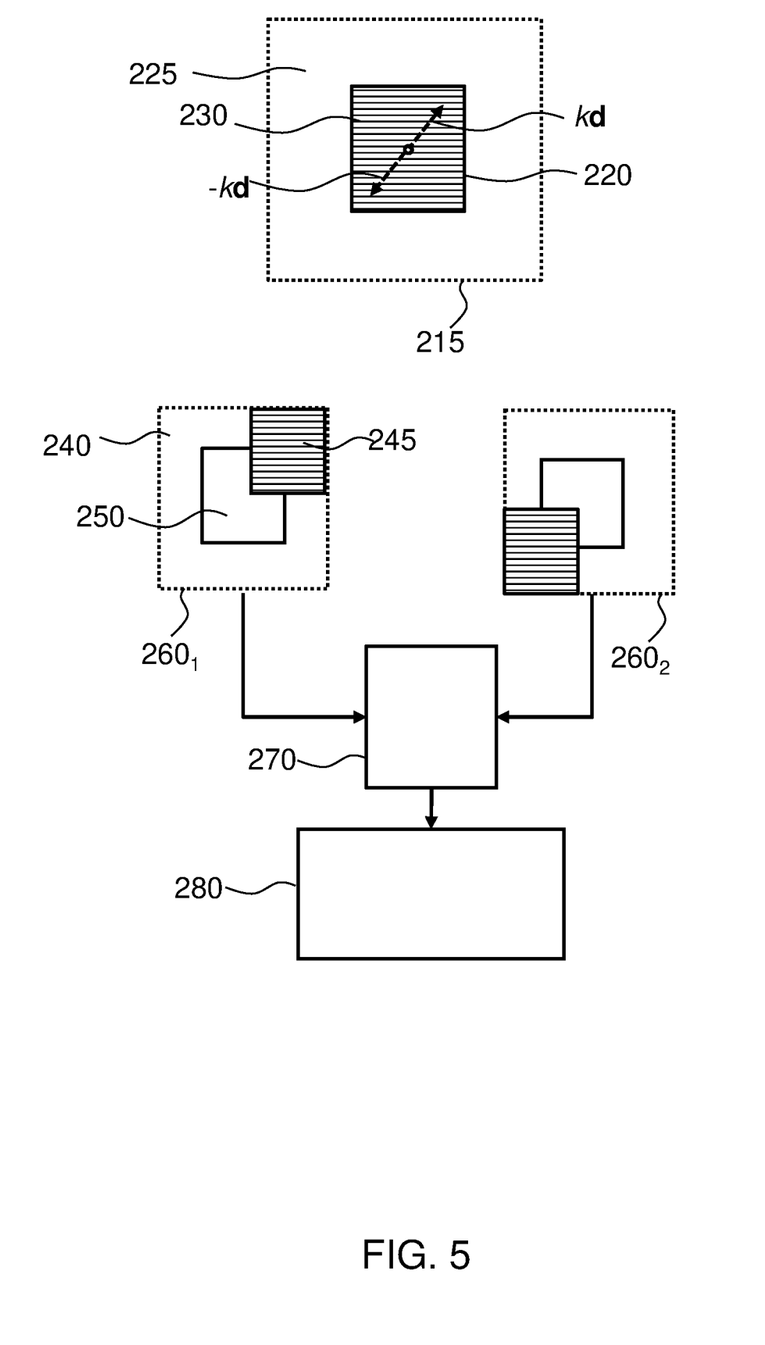
FIG. 5 depicts an alternative embodiment of a method for generating an input image dataset for training a neural network.

More specifically, in the example embodiment of FIG. 5, shifting a first copy of the reference image 215 in a first direction comprises covering a portion of the first copy of the reference image 215 with a foreground image 220 so as to generate a partly-occluded image consisting of: a non-occluded portion 225 of the reference image; and an occluded portion 230 consisting of the foreground image 220. A first shift operation (with vector d) is applied to the non-occluded portion 225 of the reference image so as to generate an intermediate non-occluded portion 240 comprising all pixels of the non-occluded portion of reference image shifted in the first direction by a first shifting distance. A second shift operation (with vector kd) is applied to the occluded portion 230 so as to generate: an intermediate occluded portion 245 comprising all pixels of the foreground image shifted in the first direction by a second, larger shifting distance; and an intermediate blank portion 250 devoid of pixels from the reference image and foreground image. An intermediate image is then formed from: the intermediate non-occluded portion 240; the intermediate occluded portion 245; and the intermediate blank portion 250, and this intermediate image is cropped so as to generate the first shifted image $260_1$. A similar shifting process is undertaken with a second copy of the reference image 215 to generate a second shifted image $260_2$, but in doing so an opposite second shift operation (with vector −kd) is applied to the non-occluded portion.

It is noted here that the displacement of the foreground image is in the same direction as d. This is done because a practical use case is the interpolation using two cameras in a stereo setup.

The first $260_1$ and second $260_2$ shifted images are then stacked 270 to form an input image dataset x', i.e. x'=[$260_1$, $260_2$].

Although it is described above that the uncovered areas are treated as blank portions, they may be coded with a reserved colour value (e.g. fully white) or a separate binary 2D map, for ease of identification and/or processing for example.

The input image dataset x' is provided as the input to the neural network 280. The neural network 280 be configured to ignore the uncovered areas (i.e. blank portions) during training (zero error). Alternatively, or additionally, the neural network 280 may be configured to learn to interpret the blank portion(s) from neighbouring pixels.

As an alternative, embodiments may use a current operational depth image based renderer as a component inside the simulator. In such a case, the texture is just stretched in the occlusion region, since triangles that lie on the edge of an object are stretched. The depth map that is used must then match scalar factor k. One may, for example, sample k from a uniform distribution.

Proposed embodiments may also be modified and/or extended for the purpose of calculating optical flow as input of the neural network.

Optical flow is a known filter based method for motion estimation, wherein estimations are based on a combination of filter operations. One well-known exemplary implementation is the Lucas-Kanade method.

Image alignment (as may be addressed by proposed embodiments) may benefit from having information related to the relative motion (i.e. shift) between two or more images. Moreover, it may be the case that if such relative motion information is available, a total number of operations (in trainable network+optical flow equations) may be reduced (which may be beneficial for real-time implementations for example). The Lucas Kanade method mainly comprises linear filters and can therefore be represented as a computational graph that may be executed as part of a larger neural network using standard operations that are also supported in typical neural network inference implementations. An example of this is illustrated in FIG. 6.

Figure 6:
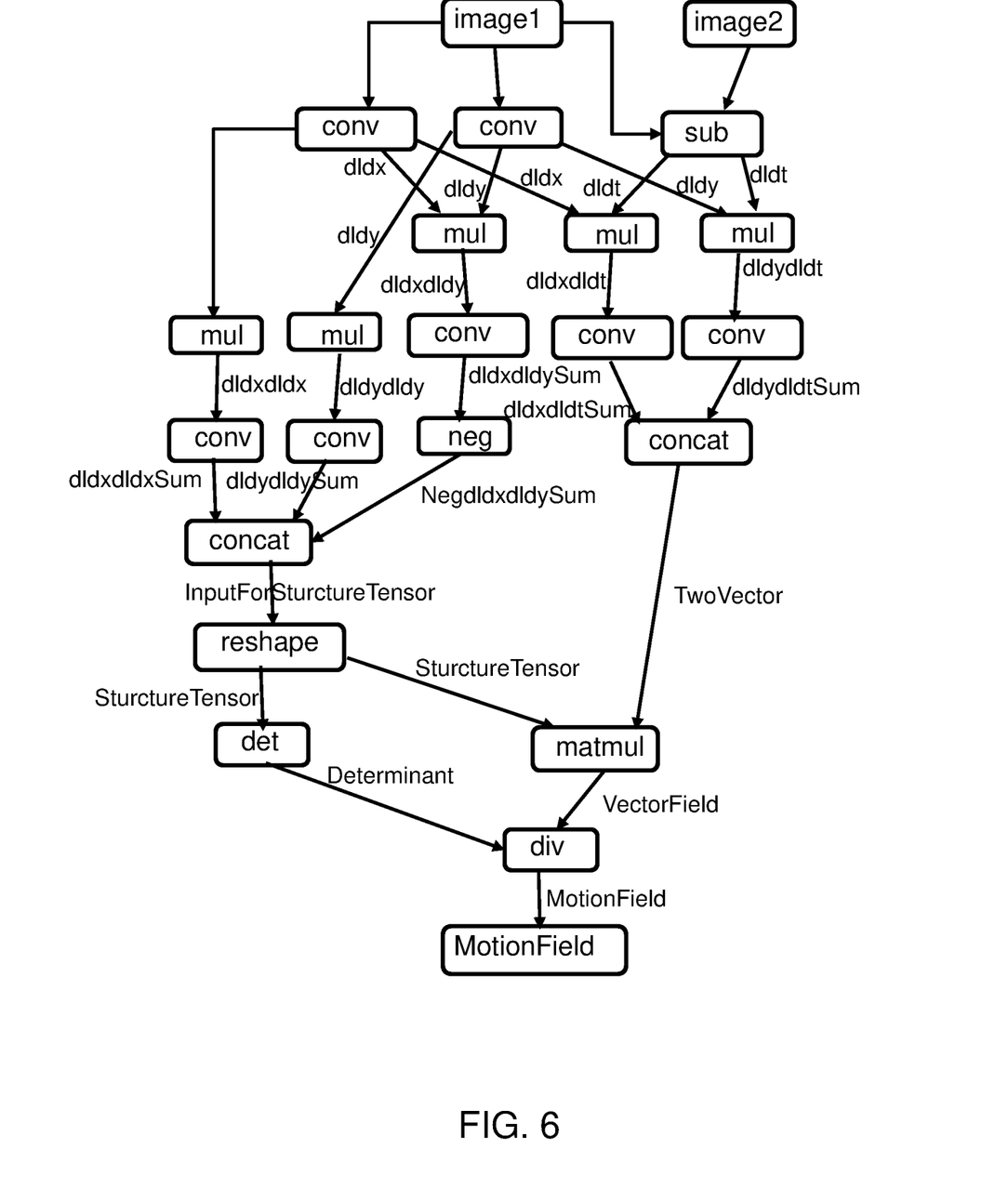
FIG. 6 is an illustration of a Lukas-Kanade optical flow represented as a computation graph, wherein the inputs provided are two intensity images, image1 and image2.
Figure 7:
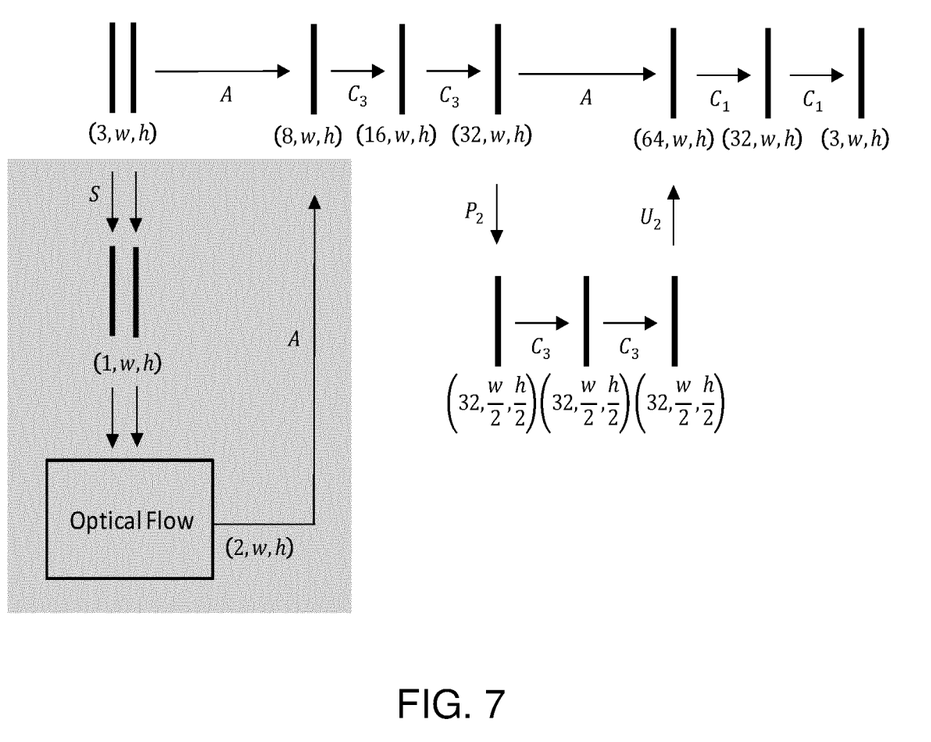
FIG. 7 depicts an exemplary architecture that may be employed to incorporate optical flow as part of an otherwise trainable neural network architecture.

FIG. 6 is an illustration of a Lucas-Kanade optical flow represented as a computation graph, wherein the inputs provided are two intensity images, image1 and image2. By way of further explanation and example, FIG. 7 depicts an exemplary architecture that may be employed for this optical flow. In this example, the network takes as input two colour images. These are each summed along the colour channel axes to form grey scale input images for the optical flow sub-graph. Another branch concatenates the two colour images along the channel axes to form a tensor with six channels. The output optical flow motion field is concatenated with these six channels and the resulting eight channels enter the remainder of the neural network. During the training phase, all layers/parameters in the entire grey box of FIG. 7 (optical flow sub-graph) are set to 'non-trainable'.

Figure 8:
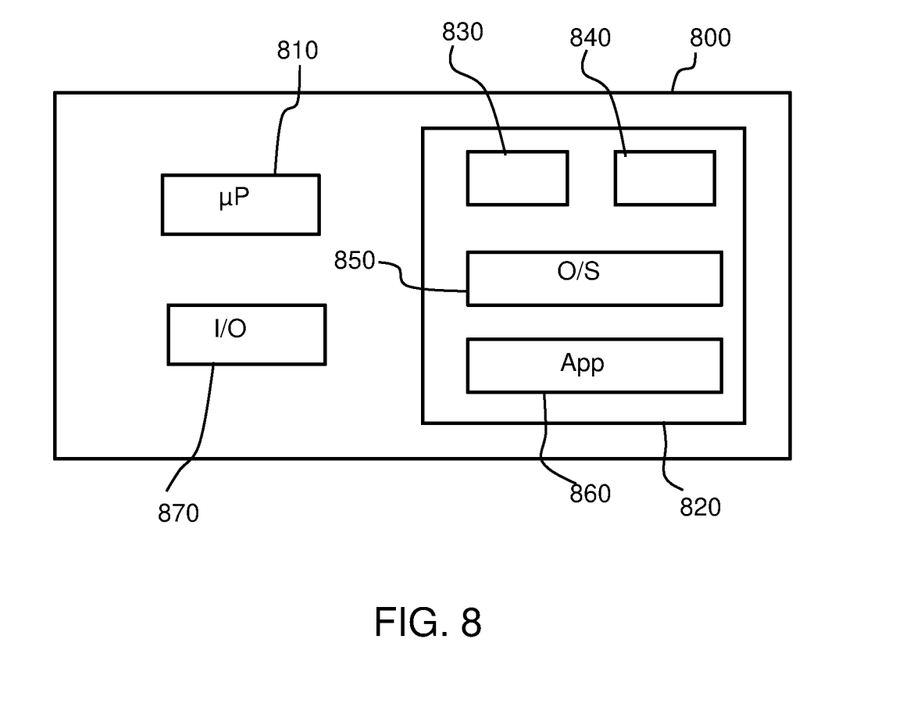
FIG. 8 illustrates an example of a computer within which one or more parts of an embodiment may be employed.

FIG. 8 illustrates an example of a computer 800 within which one or more parts of an embodiment may be employed. Various operations discussed above may utilize the capabilities of the computer 800. For example, one or more parts of a system for providing a subject-specific user interface may be incorporated in any element, module, application, and/or component discussed herein. In this regard, it is to be understood that system functional blocks can run on a single computer or may be distributed over several computers and locations (e.g. connected via internet).

The computer 800 includes, but is not limited to, PCs, workstations, laptops, PDAs, palm devices, servers, storages, and the like. Generally, in terms of hardware architecture, the computer 800 may include one or more processors 810, memory 820, and one or more I/O devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a digital signal processor (DSP), or an auxiliary processor among several processors associated with the computer 800, and the processor 810 may be a semiconductor based microprocessor (in the form of a microchip) or a microprocessor.

The memory 820 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. The software in the memory 820 includes a suitable operating system (O/S) 850, compiler 840, source code 830, and one or more applications 860 in accordance with exemplary embodiments. As illustrated, the application 860 comprises numerous functional components for implementing the features and operations of the exemplary embodiments. The application 860 of the computer 800 may represent various applications, computational units, logic, functional units, processes, operations, virtual entities, and/or modules in accordance with exemplary embodiments, but the application 860 is not meant to be a limitation.

The operating system 850 controls the execution of other computer programs, and provides scheduling, input-output control, file and data management, memory management, and communication control and related services. It is contemplated by the inventors that the application 860 for implementing exemplary embodiments may be applicable on all commercially available operating systems.

Application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 850. Furthermore, the application 860 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, JavaScript, FORTRAN, COBOL, Perl, Java, ADA, NET, and the like.

The I/O devices 870 may include input devices such as, for example but not limited to, a mouse, keyboard, scanner, microphone, camera, etc. Furthermore, the I/O devices 870 may also include output devices, for example but not limited to a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or intranet.

If the computer 800 is a PC, workstation, intelligent device or the like, the software in the memory 820 may further include a basic input output system (BIOS) (omitted for simplicity). The BIOS is a set of essential software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer 800 is activated.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 860 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

A single processor or other unit may fulfill the functions of several items recited in the claims.

A computer program may be stored/distributed on a suitable medium, such as an optical storage medium or a solid-state medium supplied together with or as part of other hardware, but may also be distributed in other forms, such as via the Internet or other wired or wireless telecommunication systems.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method comprising:
obtaining a first copy of a reference image;
obtaining a second copy of the reference image;
shifting the first copy of the reference image in a first direction so as to generate a first shifted image;
shifting the second copy of the reference image in a second direction so as to generate a second shifted image; and
generating an input image dataset, wherein the input image dataset comprises a plurality of images based on the first and second shifted images.

2. The method of claim 1,
wherein shifting the first copy of the reference image comprises shifting the first copy of the reference image by a first distance,
wherein shifting the second copy of the reference image comprises shifting the second copy of the reference image by the first distance in the second direction.

3. The method of claim 1, further comprising:
creating a third copy of the reference image;
shifting the third copy of the reference image in a third direction so as to generate a third shifted image,
wherein generating the input image dataset is based on the third shifted image.

4. The method of claim 3,
wherein the shifting of the first, second and third copies of the reference image is represented by first, second and third vectors, respectively,
wherein the sum of the first, second and third vectors is equal to zero.

5. The method of claim 1, wherein generating the input image dataset comprises concatenating the first shifted image and the second shifted image.

6. The method of claim 1, wherein shifting the first copy of the reference image comprises:
applying a shift operation to the first copy of the reference image so as to generate an intermediate image,
wherein the intermediate image comprises all pixels of the reference image shifted in the first direction; and
cropping the intermediate image so as to generate the first shifted image.

7. The method of claim 1, wherein shifting the first copy of the reference image comprises:
covering a portion of the first copy of the reference image with a foreground image so as to generate a partly-occluded image,
wherein the partly-occluded image comprises a non-occluded portion and an occluded portion, wherein the occluded portion comprises the foreground image;
applying a first shift operation to the non-occluded portion so as to generate an intermediate non-occluded portion, wherein the intermediate non-occluded portion comprises all pixels of the non-occluded portion shifted in the first direction by a first shifting distance;
applying a second shift operation to the occluded portion so as to generate an intermediate occluded portion and an intermediate blank portion,
wherein the intermediate occluded portion comprises all pixels of the foreground image shifted in the first direction by a second shifting distance,
wherein the second shifting distance is larger than the first shifting distance,
wherein the intermediate blank portion does not comprise any pixels from the reference image and the foreground image;
forming an intermediate image from the intermediate non-occluded portion, the intermediate occluded portion and the intermediate blank portion; and
cropping the intermediate image so as to generate the first shifted image.

8. The method of claim 1, wherein shifting the first copy of the reference image in a first direction comprises applying a shift operation to the first copy of the reference image, wherein the shift operation is arranged to simulate a predicted misalignment of the reference image.

9. A method of training a neural network for aligning the plurality of images, the method comprising:
generating an input image dataset according to claim 1; and
training the neural network to map the input image dataset to the reference image.

10. The method of claim 9,
wherein training the neural network comprises providing the input image dataset to a Lucas-Kanade optical flow,
wherein the optical flow is arranged as a sub-graph of the neural network.

11. A method comprising:
obtaining a plurality of input images;
providing the plurality of input images to a neural network, wherein the neural network has been trained according to the method of claim 9;
using the neural network to generate at least one prediction based on the plurality of input images; and
generating a synthesized image based on the at least one prediction.

12. A computer program stored on a non-transitory medium, wherein the computer program when executed on a processor performs the method as claimed in claim 1.

13. The method of claim 1, wherein the second direction is opposite the first direction.

14. A system comprising:
a shift circuit,
wherein the shift circuit is arranged to shift a first copy of a reference image in a first direction so as to generate a first shifted image,
wherein the shift circuit is arranged to shift a second copy of the reference image in a second direction so as to generate a second shifted image; and
a sample generator circuit,
wherein the sample generator circuit is arranged to generate an input image dataset,
wherein the input image dataset comprises a plurality of images based on the first shifted image and the second shifted image.

15. A system for training a neural network for aligning a plurality of images, the system comprising:
a system for generating an input image dataset according to claim 14; and
a training circuit, wherein the training circuit is arranged to train the neural network so as to map the input image dataset to the reference image.

16. A system for generating a synthesized image, comprising:
an input interface circuit, wherein the input interface circuit is arranged to obtain a plurality of input images;
a neural network training system according to claim 15;
a neural network, wherein the neural network is arranged to be trained by the neural network training system; and
an output circuit, wherein the output circuit is arranged to generate a synthesized image based on at least one prediction generated by the neural network,
wherein the neural network is arranged to generate the at least one prediction based on the plurality of input images.

17. The system of claim 14, wherein the second direction is opposite the first direction.

18. The system of claim 14,
wherein the shift circuit is configured to shift the first copy of the reference image by a first distance in the first direction, and
wherein the shift circuit is configured to shift the second copy of the reference image by the first distance in the second direction.

* * * * *